US005204696A

United States Patent [19]

Schmidlin et al.

[11] Patent Number: 5,204,696

[45] Date of Patent: Apr. 20, 1993

[54] CERAMIC PRINTHEAD FOR DIRECT ELECTROSTATIC PRINTING

[75] Inventors: Fred Schmidlin, Pittsford; Heiko Rommelmann, Webster, both of N.Y.

[73] Assignee: Xerox Corporation, Stamford, Conn.

[21] Appl. No.: 807,549

[22] Filed: Dec. 16, 1991

[51] Int. Cl.[5] ........ G01D 15/06

[52] U.S. Cl. ........ 346/155; 346/159

[58] Field of Search ........ 346/155, 159

[56] References Cited

U.S. PATENT DOCUMENTS

| | | | |
|---|---|---|---|
| 3,689,935 | 9/1972 | Pressman et al. | 346/74 ES |
| 4,016,813 | 4/1977 | Pressman et al. | 346/155 |
| 4,409,604 | 10/1983 | Fotland | 346/159 |
| 4,571,602 | 2/1986 | De Schamphelaere et al. | 346/160 |
| 4,595,938 | 6/1986 | Conta et al. | 346/140 R |
| 4,647,179 | 3/1987 | Schmidlin | 355/3 DD |
| 4,743,926 | 5/1988 | Schmidlin et al. | 346/159 |
| 4,860,036 | 8/1989 | Schmidlin | 346/159 |
| 4,876,561 | 10/1989 | Schmidlin | 346/159 |
| 4,921,316 | 5/1990 | Fantone et al. | 346/155 X |
| 4,959,668 | 9/1990 | Hirt | 346/155 |
| 5,038,159 | 8/1991 | Schmidlin et al. | 346/159 |
| 5,040,004 | 8/1991 | Schmidlin et al. | 346/159 |
| 5,093,676 | 3/1992 | Matsubara et al. | 346/160 |
| 5,097,277 | 3/1992 | Schmidlin et al. | 346/155 |

*Primary Examiner*—Benjamin R. Fuller
*Assistant Examiner*—Randy W. Gibson
*Attorney, Agent, or Firm*—R. Hutter

[57] ABSTRACT

A printhead for electrostatic printing comprises a membrane, made of a non-crystalline ceramic material, defining a first surface and a second surface, and defining a plurality of apertures therein. A plurality of addressable segmented electrodes are disposed on the first surface around substantially the periphery of an aperture on the first surface, each segment of the addressable segmented electrodes being isolated from each other segment. A conductive layer is disposed on the second surface around substantially the periphery of at least one aperture on the second surface. The ceramic membrane facilitates the incorporation of active electronic devices on the printhead.

11 Claims, 5 Drawing Sheets

CERAMIC PRINTHEAD FOR DIRECT ELECTROSTATIC PRINTING

FIELD OF THE INVENTION

The present invention relates to electrostatic printing devices and more particularly to an electronically addressable printhead utilized for depositing developer in image configuration on plain paper substrates.

BACKGROUND OF THE INVENTION

Of the various electrostatic printing techniques, the most familiar and widely utilized is that of xerography, wherein latent electrostatic images formed on a charge retentive surface are developed by a suitable toner material to render the images visible, the images being subsequently transferred to plain paper. A lesser known and utilized form of electrostatic printing is one that has come to be known as direct electrostatic printing (DEP). This form of printing differs from the aforementioned xerographic form, in that the toner or developing material is deposited directly onto a non-image-charged substrate in image configuration. This type of printing device is disclosed in U.S. Pat. No. 3,689,935 issued Sep. 5, 1972 to Gerald L. Pressman et al.

Pressman et al. disclose an electrostatic line printer incorporating a multilayered particle modulator or printhead comprising a layer of insulating material, a continuous layer of conducting material on one side of the insulating layer, and a segmented layer of conducting material on the other side of the insulating layer. At least one row of apertures is formed through the multilayered particle modulator. Each segment of the segmented layer of the conductive material is formed around at least a portion of an aperture and is insulatively isolated from every other segment of the segmented conductive layer. Selected potentials are applied to each of the segments of the segmented conductive layer while a fixed potential is applied to the continuous conductive layer. An overall applied field projects charged particles through the row of apertures of the particle modulator and the density of the particle stream is modulated according to the pattern of potentials applied to the segments of the segmented conductive layer. The modulated stream of charged particles impinge upon a print-receiving medium interposed in the modulated particle stream and translated relative to the particle modulator to provide line-by-line scan printing. In the Pressman et al. device the supply of the toner to the control member is not uniformly affected and irregularities are liable to occur in the image on the image receiving member. High-speed recording is difficult and moreover, the openings in the printhead are liable to be clogged by the toner.

DEP printheads such as those described in, for example, U.S. Pat. Nos. 4,647,179; 4,743,926; 4,876,561; 5,040,004; and 5,038,159 typically comprise an electrically insulative base member in which the apertures are defined, which is fabricated from a polyimide film of a thickness of one to two mils (0.025 to 0.05 mm). The most common material for the base member is a thin layer of polyimide plastic. This material and others similar thereto have several practical disadvantages. Such a thin membrane as needed for the base member will obviously be very flexible and fragile, and consequently, the base member must be mounted on a rigid precision plate. The precision plate must be very finely machined to maintain a consistent spatial relationship among the donor roll, the apertures, and the paper. The thinness and flexibility of the base member obviously presents a problem of ruggedness while the equipment is in use. These numerous practical problems add to the cost and reduce the reliability of prior art DEP printheads.

U.S. Pat. No. 4,860,836 to Schmidlin discloses a near-letter-quality DEP printhead having at least three rows of equally spaced and staggered apertures. As can be seen in that patent, however, each aperture is addressed with a single dedicated electrode for that aperture only. This arrangement is clearly expensive, and requires the placement of many delicate conductive leads on the base member, with the attendant problems of durability.

It is an object of the present invention to provide a DEP printhead which avoids many of the practical problems associated with prior art printheads.

It is another object of the present invention to provide such a DEP printhead which is made of a rigid, non-crystalline ceramic, which may be precisely shaped to conform to the shape of a donor roll, and in which multiple rows of apertures may be provided, whereby the apertures in each row are precisely spaced relative to a donor roll and a substrate.

It is another object of the present invention to provide such a DEP printhead which may be manufactured by the convenient method of photosensitive etching, for forming both the apertures and the electrodes therein.

It is another object of the present invention to provide such a ceramic DEP printhead which allows convenient installation of active electronic devices thereon.

Other objects will appear hereinafter.

SUMMARY OF THE INVENTION

In accordance with the above objects, the present invention is a printhead for electrostatic printing, comprising a membrane made of a non-crystalline ceramic material, defining a first surface and a second surface, and a plurality of apertures therein. A plurality of addressable segmented electrodes are disposed on the first surface around substantially the periphery of each aperture on the first surface, each segment of the addressable segmented electrodes being isolated from each other segment. A conductive layer is disposed on the second surface around substantially the periphery of at least one aperture on the second surface.

In one embodiment of the present invention, active electronic devices may be attached to the membrane for controlling the printhead through the electrodes. These electronic devices may be used to facilitate multiplexing of electronic leads to individual apertures, and the technique of "backplaning" for realization of a multi-row printhead.

BRIEF DESCRIPTION OF THE DRAWINGS

While the present invention will hereinafter be described in connection with a preferred embodiment thereof, it will be understood that it is not intended to limit the invention to that embodiment. On the contrary, it is intended to cover all alternatives, modifications, and equivalents as may be included within the spirit and scope of the invention as defined by the appended claims.

DETAILED DESCRIPTION OF THE DRAWINGS

Figure 1:
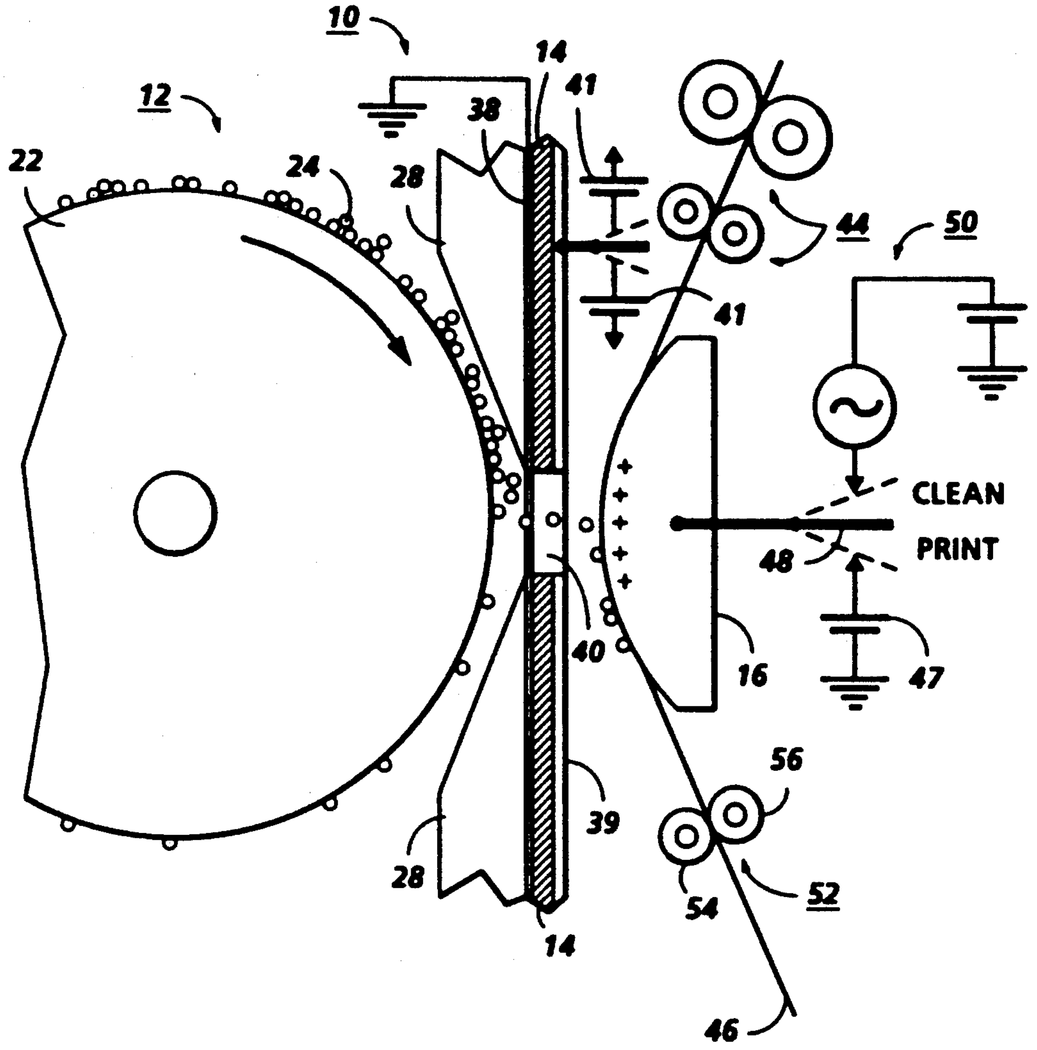
FIG. 1 PRIOR ART
FIG. 1 is a partially schematic view showing the elements of a direct electrostatic printing apparatus, known in the prior art.

FIG. 1 is a schematic illustration of a prior art DEP apparatus. The printing apparatus 10 includes a developer delivery system generally indicated as 12, a printhead structure 14, and a backing electrode, or shoe, 16. (The relative sizes of the elements in FIG. 1, as well as the other Figures, are not drawn to scale.)

The developer delivery system 12 shown in FIG. 1 is of the common donor-roll type, wherein (in this case negatively) charged toner particles are conveyed via a rotating cylinder, or donor roll, 22 to a plurality of apertures on the printhead, such as that shown in cross-section in FIG. 1 and indicated as aperture 40. The donor roll 22 may also be in the form of a cylindrical traveling wave conveyor such as that described, for example, in U.S. Pat. No. 4,743,926 to Schmidlin et al. As described in that patent, toner particles travel on the surface of donor roll 22 in the direction shown, by means of traveling waves of charge created thereon by a series of electrodes inside the donor roll 22, at a rate which ensures that a constant supply of toner particles are conveyed to aperture 40, which is one of numerous addressable apertures arranged in a linear array in the printhead 14, as will be explained below. Alternatively, toner particles may be conveyed to aperture 40 by a rotating donor belt, as described, for example, in U.S. Pat. No. 5,040,004 to Schmidlin et al. Toner on the donor roll 22 not passed through the printhead may be removed from the donor roll downstream with an electrostatic pickoff device, vacuum pickoff device, or scraper blade.

The printhead structure 14 comprises a layered member including an electrically insulative base member 36. In the prior art this base member is typically fabricated from a polyimide film having a thickness on the order of 1 to 2 mils (0.025 to 0.50 mm). The base member is clad on one side with a continuous conductive layer or shield 38 of aluminum which is approximately 1 micron thick. The opposite side of the base member 36 carries segmented conductive layer 39 thereon, which is fabricated from aluminum and has a thickness similar to that of the shield 38. The total thickness of the printhead structure is on the order of 0.001 to 0.002 inch (0.027 to 0.052 mm). A typical diameter of the aperture 40 is approximately 0.15 mm, as described, for example, in U.S. Pat. No. 4,876,561 to Schmidlin. The printhead may be adapted to have specially-shaped apertures, as in, for example, U.S. Pat. No. 5,038,159 to Schmidlin et al.

A plurality of holes or apertures 40 (only one of which is shown), each approximately 0.15 mm in diameter, are provided in the layered structure in a pattern suitable for use in recording information. The aperture 40 extends through the base member 36 and the conductive layers 38 and 39. The apertures, combined with the segmented conductive layers 39, form an electrode array of individually addressable electrodes. With the shield grounded and with 0–100 volts applied to an addressable electrode, toner is propelled through the aperture associated with that electrode. It should be noted that the aperture shown as 40 is only one of a single-file row of addressable apertures, which are selectively addressed and "opened" as needed for the printing of the desired image, as will be explained below. The row of apertures must be disposed relative to a tangent of the surface of donor roll 22 so that each aperture in the row is consistently spaced between donor roll 22 and the surface of the substrate 46. Thus, high-quality DEP printheads are generally limited to printing through one row of apertures at a time. If a plurality of rows of apertures are provided in conjunction with a donor roll (i.e., there are extra apertures above and below aperture 40 as it is illustrated in FIG. 1) the apertures in the various rows will be spaced differently relative to the donor roll 22 and the substrate 46, so that the behavior of the toner particles passing through the various rows will not be consistent, with a noticeable effect on documents so printed on the substrate 46. Thus, the speed facilitated by multiple rows of apertures in the printhead will involve a trade-off of print quality.

With a negative 350 volts applied to an addressable electrode, toner is prevented from being propelled through the aperture. Image intensity can be varied by adjusting the voltage on the control electrodes between 0 and minus 350 volts. Addressing of the individual electrodes can be effected in any well known manner known in the art of printing using electronically addressable printing elements.

The electrode, or shoe, 16 has an arcuate shape as shown but as will be appreciated, the present invention is not limited by such a configuration. The shoe 16 which is positioned on the opposite side of a plain paper recording medium 46 from the printhead 14 supports the recording medium in an arcuate path in order to provide an extended area of contact between the medium and the shoe.

The recording medium 46 may comprise roll paper or cut sheets of paper fed from a supply tray, not shown. The recording medium is spaced about 0.002 to 0.030 inch from the printhead 14 as it passes thereby. The recording medium 46 is transported in contact with the shoe 16 via edge transport roll pairs 44. During printing the shoe 16 is electrically biased to a DC potential of approximately 400 volts via a DC voltage source 47.

In the event that any toner becomes agglomerated on the printhead, switch 48 is periodically actuated such that a DC-biased AC power supply 50 is connected to the the shoe 16 to effect cleaning of the printhead. The voltage from the source 50 is supplied at a frequency which causes the toner in the gap between the paper and the printhead to oscillate and bombard the printhead.

Momentum transfer between the oscillating toner and any toner on the control electrodes of the printhead causes the toner on the control electrodes to become dislodged. The toner so dislodged is deposited on the substrates subsequently passed over the shoe 16.

As the fusing station, a fuser assembly, indicated generally by the reference numeral 52, permanently affixes the transferred toner powder images to recording medium 46. Preferably, fuser assembly 52 includes a heated fuser roller 54 adapted to be pressure engaged with a back-up roller 56 with the toner powder images contacting fuser roller 54. In this manner, the toner powder image is permanently affixed to copy substrate 46.

The prior art DEP printhead shown in FIG. 1, as mentioned above, comprises an electrically insulative base member 36, which is fabricated from a polyimide film of a thickness of one to two mils (0.025 to 0.05 mm). The most common material for the base member 36 is a thin layer of polyimide plastic, such as that known under the trade name Kapton®, made by the E. I. duPont DeNemours Company. This material and others similar thereto have several practical disadvantages. Such a thin membrane as needed for base member 36 will obviously be very flexible and fragile. Consequently, the base member 36 must be mounted on a rigid precision plate. A portion of such a plate, typically made of solid aluminum, is shown as parts 26 and 28 in FIG. 1. In order to maintain the correct position of the apertures 40 in the printhead, the base member 36 is tightened over the gap between parts 26 and 28 such as with a special spring-loaded frame (not shown) to maintain base member 36 at the requisite tautness. The tapers of portions 26 and 28 must be precisely machined to conform closely to the curvature of the donor roll 22, so that donor roll 22 may be placed sufficiently close to the aperture 40 to ensure efficient movement of toner particles through each aperture 40. Such precise tapering must be provided even in the case of using a belt donor, as in U.S. Pat. No. 5,040,004. Similarly, the side of portions 26 and 28 facing the base member 36 must be machined to a precise degree of flatness in order to keep all of the apertures in a row equally spaced relative to the donor roll 22 and the substrate 46.

Figure 2:
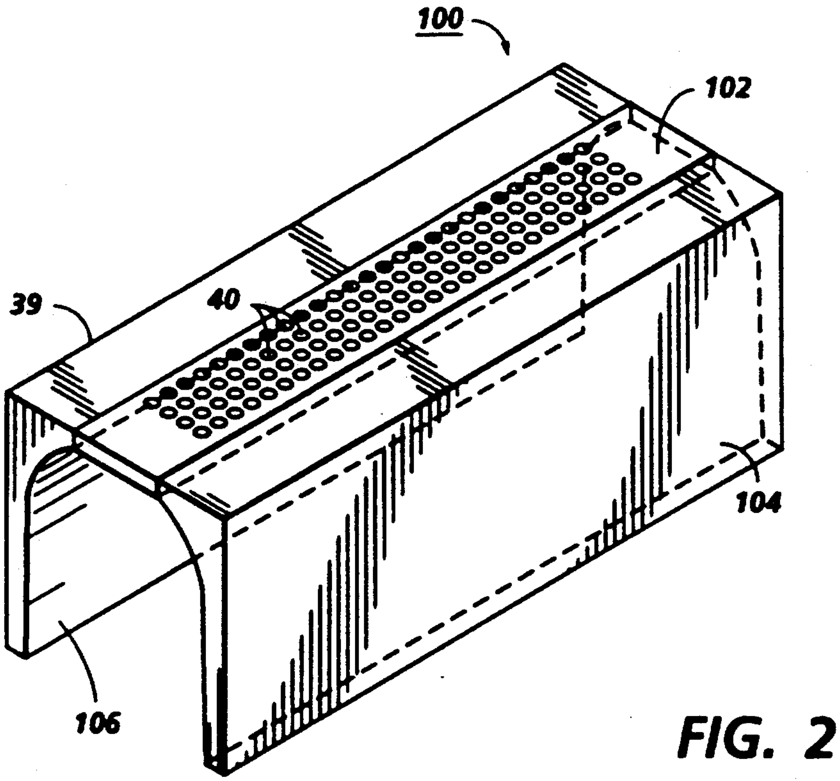
FIG. 2 is a perspective view showing, in isolation, a printhead for direct electrostatic printing, according to the present invention.
Figure 3:
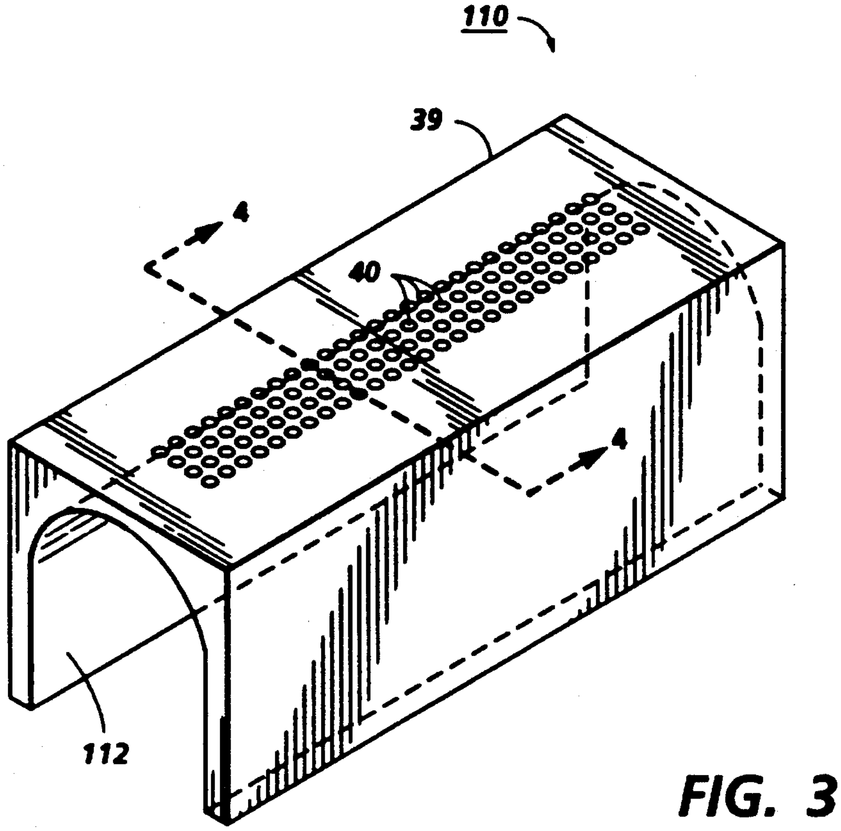
FIG. 3 is a perspective view showing, in isolation, a printhead for direct electrostatic printing, according to an alternate embodiment of the present invention.

FIGS. 2 and 3 show, respectively, two embodiments of a DEP printhead according to the present invention. The apertures shown in both Figures are not drawn to scale with the rest of the DEP printhead; in a practical system, the length of the printhead may be the full width of a printed document, such as 9 inches or more, with the apertures therein spaced at 300 per inch along the length of the printhead. Turning first to FIG. 2, there is shown a printhead generally indicated as 100. The printhead 100 includes a ceramic membrane 102 which is mounted on a base member 104. Base member 104 is preferably a solid block of noncrystalline ceramic material having a central cavity 106 defined therein. The central cavity 106 is preferably shaped to accept at least a major portion of a cylindrical donor roll 22, as would be found, for example, in a DEP printhead like that shown in FIG. 1. The cavity 106 in base 104 should be shaped to substantially surround a donor roll 22 so that the outer surface of the cylindrical donor roll 22 will be disposed closely adjacent the ceramic membrane 102. Ceramic membrane 102 has defined therein a plurality of rows of apertures 40. The individual apertures 40 shown in the printhead 100 of FIG. 2 are homologous in function to the aperture 40 shown in the prior art printhead of FIG. 1. Similarly, the ceramic membrane 102 shown in FIG. 2 includes thereon a continuously conductive layer 38 of aluminum which is approximately 1 micron thick, and, on its opposite side, a segmented conductive layer 39, as in the prior art printhead of FIG. 1.

The important difference between the printhead 100 of FIG. 2 and the prior art structure 14 of FIG. 1 is that, instead of being made of a polyimide plastic as in the prior art, the ceramic membrane 102 is made of a rigid, noncrystalline ceramic material. Such a rigid ceramic material requires no external support structure, such as the spring loaded frame required to maintain the tautness of the thin, flexible plastic of the prior art. The ceramic membrane 102 is merely attached (by adhesive or other means) to the base 104. None of the practical complications associated with a thin plastic film, such as the provision of a finely-machined aluminum support, are necessary, because the ceramic membrane 102 is rigid and can be precisely dimensioned in the manufacturing process.

Specifically, a preferred material for the membrane 102 is a photosensitive noncrystalline ceramic, meaning a ceramic which exhibits improved acid-etching characteristics during or after exposure to light. Such a photosensitive ceramic is manufactured by the Corning Glass Company under the trade name FOTOCERAM. Such a photosensitive ceramic facilitates precise photo-etching of apertures and other configurations in either surface of the membrane 102. With a photosensitive ceramic, exposure to light (particularly UV light) improves the "aspect ratio" in the etching step; that is, an improved aspect ratio in the areas that have been exposed will cause the ceramic to etch downward at a greater rate than outward when acid is applied to the ceramic in the etching process. In the present case, for example, the row or rows of small, precise apertures 40 may be imaged onto the blank of membrane 102 by photo-lithography, and the apertures created by applying acid to the exposed areas. Because of this improved aspect ratio, it is possible to create the very small, precise apertures 40 required for a DEP printhead in the membrane 102.

FIG. 3 shows an alternate embodiment of the printhead 100, wherein the ceramic membrane and the base of the printhead are formed in a unitary member, a block 110 of photosensitive noncrystalline ceramic. In this case, the continuous conductive layer 38 may be deposited on the inner surface of a central cavity 112 in the block 110, while the segmented conductive layer may be formed in the top surface of block 110.

In both embodiments of the printhead shown respectively in FIGS. 2 and 3, the conductive layers 38 and 39 are typically made of aluminum, although other materials are of course possible, and are typically deposited on the surfaces of the ceramic membrane by known techniques such as vacuum deposition or sputtering. The thickness of the ceramic membrane 102 around the areas of the apertures 108 in block 110 is preferably between 25 and 50 microns (1-2 mils). A preferred thickness of the conductive layers 38 and 39 is approximately 1 micron.

Another advantage of the ceramic membrane of the present invention is that the rigidity and temperature characteristics of a ceramic allow for active electronic devices to be installed on one surface of the membrane, using "chip-on-glass" techniques which are familiar in the semiconductor industry. The incorporation of active electronic devices, such as amplifiers, integrated circuit chips, and so forth, will allow, for example, multiplexing of electrical leads to each of the segmented electrodes 39. Without multiplexing, every addressable aperture 40 in a printhead requires its own dedicated lead thereto, to be activated as necessary in the course of use. If the printhead is designed for high quality printing, wherein there would be upwards of 300 apertures per inch or more, to provide a lead for each aperture results in a very complicated, delicate printhead, as well as increasing the likelihood of crosstalk among the various leads on the printhead. With the multiplexing afforded by active devices on the surface of the ceramic membrane, much fewer lines are needed, on the order of twelve leads per printhead as opposed to the hundreds required without multiplexing. Such installation of active devices is relatively straightforward on a noncrystalline ceramic surface, while it would be extremely difficult on a thin plastic film as in the prior art.

Figure 4:
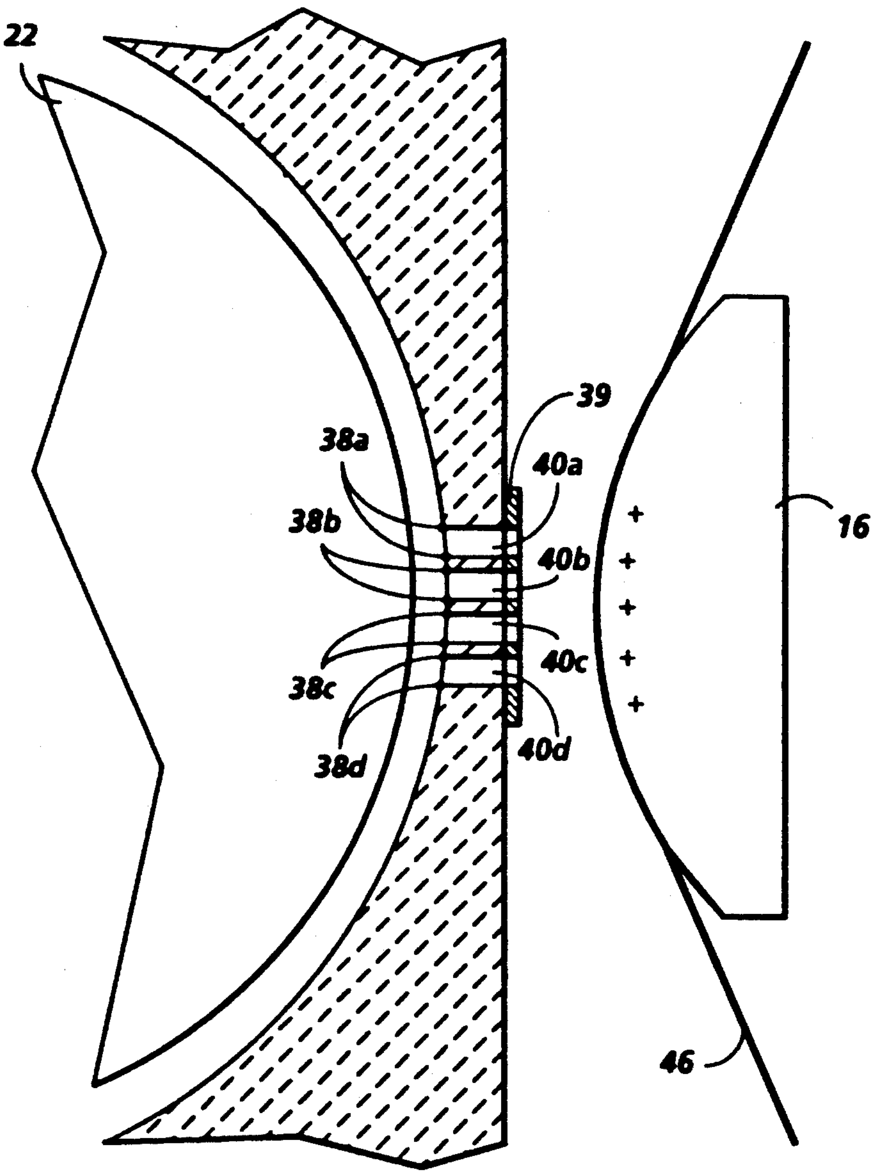
FIG. 4 is a cross-sectional view through line 4—4 in FIG. 3, showing one embodiment of the printhead of the present invention in the context of a DEP printer.

FIG. 4 is a cross-sectional view through line 4—4 in FIG. 3, showing one embodiment of the printhead of the present invention in the context of a DEP printer. Comparing FIG. 4 to FIG. 1, wherein like reference numbers indicate like elements, it can be seen that the thin membrane 14 supported by aluminum frames 26, 28 of the prior art have been replaced by the single block 110. It will be noted that the interior portion of block 110 may closely follow the curvature of the donor roll 22. This consistent following of the curvature of donor roll 22 enables multiple rows of apertures 40 to be formed in the printhead. In the embodiment of FIG. 4, the rows of apertures are indicated as 40*a*–*d*. Because the apertures 40*a*–*d* may be precisely shaped within the block 110, compensation can be made of the differences in configuration among the various rows of apertures relative to the donor roll 22 and the sheet 46. This use of multiple rows of apertures can be exploited to increase either the speed, or quality, or both, of prints made in this way.

Figure 5:
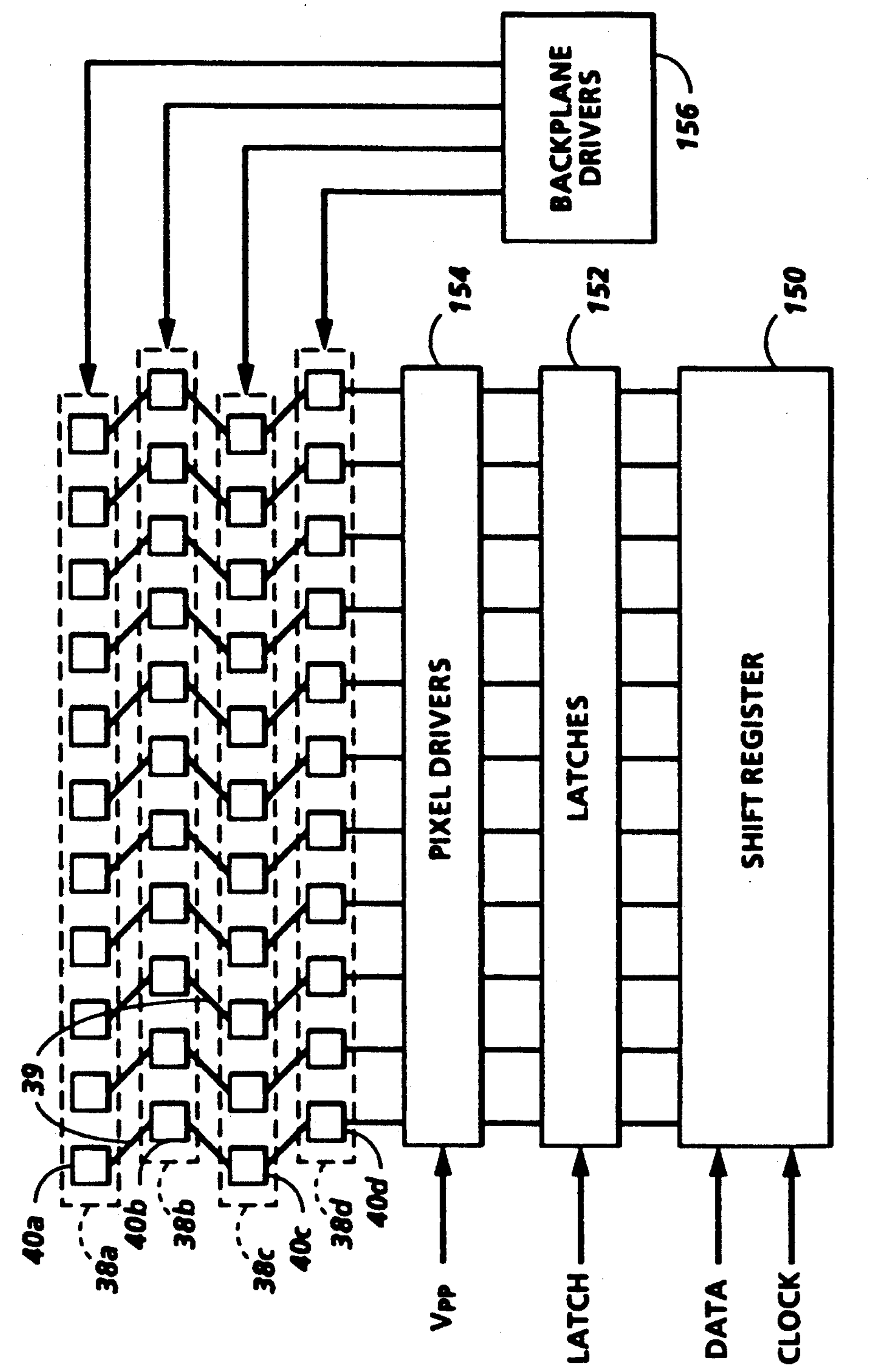
FIG. 5 is a schematic diagram showing a configuration of pixel drivers and backplane drivers, for use in a printhead according to the present invention.

In order to realize a multi-row printhead for practical use, an arrangement of what is known as "backplaning" is preferably used. As will be made apparent below, the chip-on-glass manfacturing technique enabled by the present invention facilitates the circuitry for backplaning for addressing individual apertures in a multi-row printhead. The essence of the backplaning technique is that, in an array formed by multiple intersecting rows of apertures, individual apertures may be addressed as needed by a column-and-row technique. The backplanes themselves are single electrodes, each passing through an entire row of apertures 40*a*–*d* in the printhead. Simultaneously, each set of apertures across the rows can be thought of as an individual "column". Thus, each individual aperture in the printhead will have a unique address by the intersection of column and row. FIG. 5 is a basic schematic diagram showing a possible configuration of pixel drivers and backplane drivers, which could be used to realize a printhead according to the present invention. A parallel arrangement of shift register 150, latches 152, and pixel drivers 154, in a configuration which would be familiar to those in the art of digital systems, is adapted to output parallel digital data to activate individual columns of apertures according to data input corresponding to an image desired to be printed. In addition to the columns of data, each responsive to one parallel line out of pixel driver 154, is a system of backplane drivers shown generally as 156. The backplane driver 156 activates, in accordance with appropriate data from the shift register, the appropriate backplane 38*a* –*b*, that is, one entire row of apertures. Each backplane 38*a* –*d* is homologous in function to the continuous conductive layer 38 shown in the prior art printhead of FIG. 1. Thus, an individual aperture is activated by the appropriate combination of a signal from the shift register and a signal from the backplane driver 156.

Returning to FIG. 4, it can be seen that the backplanes driven by backplane driver 156 are realized as rows of electrodes 38*a*–*d*. As was shown schematically in FIG. 5, each backplane 38*a*–*d* is homologous in function to the continuous conductive layer 38 shown in the prior art printhead of FIG. 1. In FIG. 4 is shown in cross-section a portion of each backplane 38*a*–*d*, each backplane itself extending out of the page. On the other side of the apertures 40*a*–*d* is shown in cross section a single column electrode 39, being a common electrode for every aperture in that single column; each column, of course, having its own individual column electrode. Each aperture 40, then, represents an intersection of a column electrode 39 with a backplane 38*a*–*d*. As in the printhead of FIG. 1, a particular aperture is activated to print black when a high potential is created on both the row and column electrodes 38 and 39 respectively; in the present case, each individual aperture 40*a*–*d* is addressed by applying voltages simultaneously to the appropriate backplane 38*a*–*d* and column electrode 39. When an aperture is set to print white (not pass toner therethrough), either the backplane 38*a*–*d* associated therewith is set to a low voltage, or the column electrode 39 is set to a low voltage. In an operative DEP printhead of the type shown in FIG. 4, typical mean values of high and low voltages for the rows and column electrodes are as follows: For column elctrodes such as 39, a high voltage would be in the range of 0–100 V, while a low voltage would range from −300 V to −350 V. For each backplane 38, a high voltage is about 0–10 V, while a low voltage ranges from −150 V to −200 V.

On the printhead, the array of apertures need not be arranged in rows and columns at right angles to each other; conceivably the rows and columns may be arranged in a staggered fashion. Further, the apertures in the array may be sized and arranged consistent with an optimized scheme for print quality, such as disclosed in U.S. Pat. No. 4,860,036, wherein the number of rows is equal to the distance between aperture centers divided by the diameter of a spot of toner deposited by each aperture.

Figure 6:
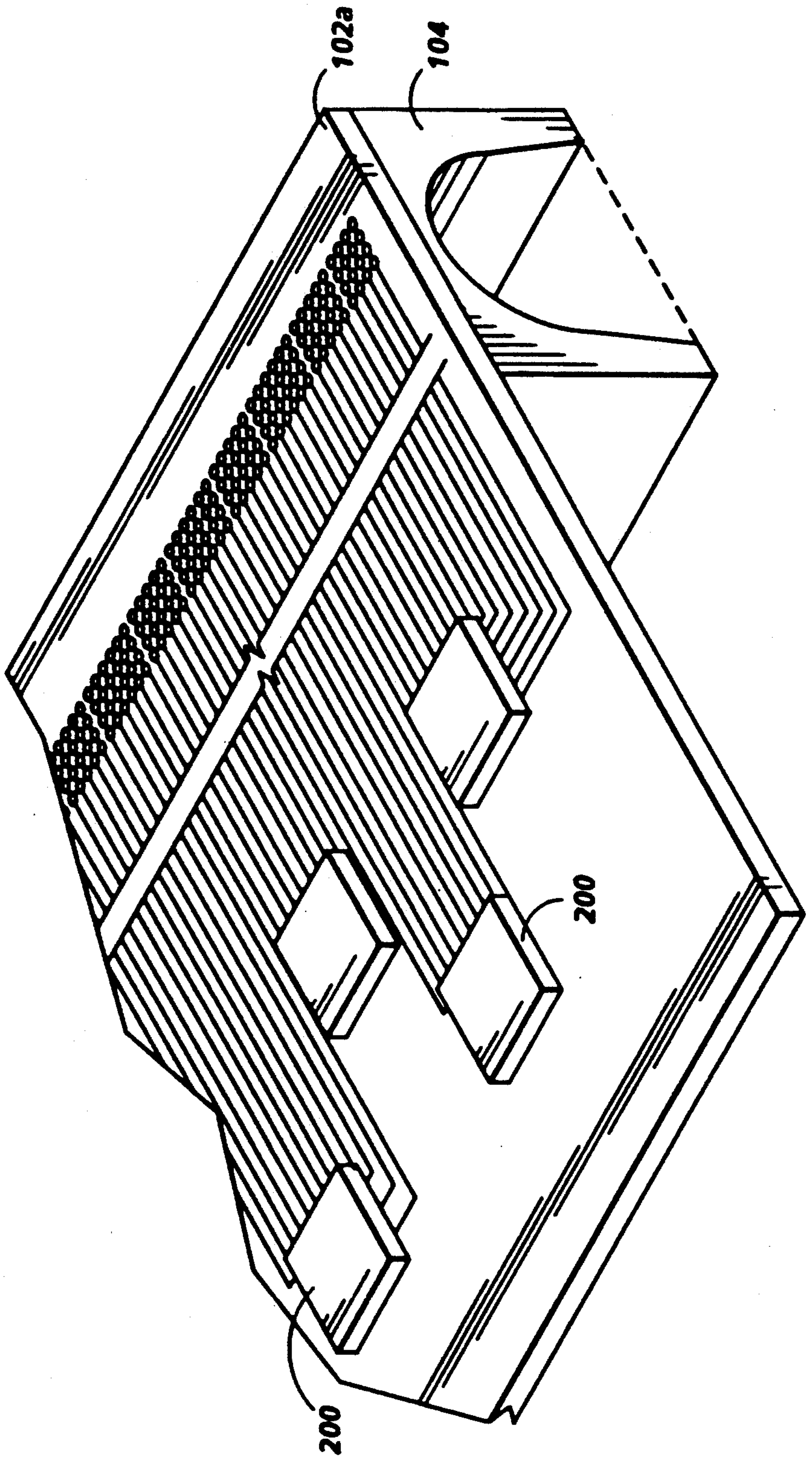
FIG. 6 is an elevational view of an embodiment of a printhead wherein electronic components are built into the printhead.

As mentioned above, the ceramic printhead generally illustrated in FIG. 4 is conducive to embodiment by chip-on-glass techniques directly on board the printhead. FIG. 6 is an elevational view of one possible embodiment of a printhead wherein the electronic components are built into the printhead. In this embodiment, a printhead 104, similar to that shown in FIG. 2, is attached to a ceramic membrane 102*a*, similar to the function of ceramic membrane shown in FIG. 2, although extended for the installation of IC chips 200 and associated leads (generally shown as 202) etched therein. What should be emphasized is that the apertures 40 are etched directly into the ceramic membrane 102*a*, upon which the electronic components 200 are directly incorporated. Thus, the effective part of the printhead and its associated electronics can be formed in one piece. Incorporation of the IC chips 200 and the associated electrodes 202 thus allow a printhead with relatively sophisticated electronics (e.g., backplaning and multiplexing) placed directly thereon, which may be manufactured in a single process. Preferably, the chips 200 are attached to the printhead by a chip-on-glass technique, secured on the printhead with conductive epoxy. An alternative technique for incorporating the active components is by vacuum deposition, as of thin-film transistors. In contrast, with the thin flexible membrane of the prior art, loose wire leads would be required, which would be extremely expensive and complicated to incorporate on the fragile membrane.

While this invention has been described in conjunction with a specific apparatus, it is evident that many alternatives, modifications, and variations will be apparent to those skilled in the art. Accordingly, it is intended to embrace all such alternatives, modifications, and variations as fall within the spirit and broad scope of the appended claims.

What is claimed is:

1. A printhead for electrostatic printing, comprising:
- a membrane, made of a non-crystalline ceramic material, defining a first surface and a second surface, and defining a plurality of apertures therein;
- a donor member, adapted to convey toner particles to the plurality of apertures in the membrane;
- a plurality of addressable segmented electrodes, each disposed on the first surface of the membrane around substantially a periphery of an aperture on the first surface, each segment of the addressable segmented electrodes being isolated from each other segment; and
- a conductive layer, disposed on the second surface of the membrane around substantially a periphery of at least one aperture on the second surface, one of said first or second surface of the membrane faces said donor member and is shaped to substantially conform to the shape of the donor member.

2. A printhead as in claim 1, wherein the ceramic material is rigid.

3. A printhead as in claim 1, wherein the ceramic material is photosensitive during a step in the manufacture of the printhead.

4. A printhead as in claim 1, further comprising a base extending from the membrane and forming a partial enclosure therewith.

5. A printhead as in claim 4, wherein the membrane and the base are formed as a unitary member.

6. A printhead as in claim 1, further comprising:
- an active electronic device; and
- means for attaching the active electronic device on one surface of the membrane.

7. A printhead as in claim 6, wherein the segmented electrodes are adapted for multiplexed control of the apertures associated therewith by the active electronic device.

8. A printhead as in claim 1, further comprising:
- an array of apertures defined in the membrane, the array having intersecting columns and rows, each column and row in the array including a plurality of apertures;
- a plurality of column electrodes formed by the segmented electrodes, each column electrode being common to the apertures in a column and electrically isolated from the column electrodes associated with other columns; and
- a plurality of backplane electrodes formed by the conductive layer, disposed on the second surface around substantially the circumference of each aperture on the second surface, each backplane electrode being common to a row and electrically isolated from the backplane electrodes associated with other rows.

9. A printhead as in claim 8, further comprising electronic addressing means for creating a potential between a column electrode and a backplane electrode for at least one selected aperture.

10. A printhead as in claim 9, wherein the electronic addressing means includes a shift register for loading imagewise data to selected apertures in a selected row, and a backplane driver for activating the selected row of apertures.

11. A printhead as in claim 10, wherein at least a portion of the electronic addressing means is in the form of an integrated circuit attached to the membrane.

* * * * *